(12) United States Patent
Agrawal et al.

(10) Patent No.: US 7,346,637 B2
(45) Date of Patent: Mar. 18, 2008

(54) POLYNOMIAL TIME DETERMINISTIC METHOD FOR TESTING PRIMALITY OF NUMBERS

(75) Inventors: Manindra Agrawal, Kanpur (IN); Neeraj Kayal, Assam (IN); Nitin Saxena, Allahabad (IN)

(73) Assignee: Indian Institute of Technology, Kanpur (IN)

( * ) Notice: Subject to any disclaimer, the term of this patent is extended or adjusted under 35 U.S.C. 154(b) by 647 days.

(21) Appl. No.: 10/631,346

(22) Filed: Jul. 31, 2003

(65) Prior Publication Data

US 2005/0027764 A1 Feb. 3, 2005

(51) Int. Cl.
*G06F 15/00* (2006.01)
(52) U.S. Cl. .................................................. 708/200
(58) Field of Classification Search ................ 708/200
See application file for complete search history.

(56) References Cited

U.S. PATENT DOCUMENTS

| | | | | |
|---|---|---|---|---|
| 6,307,938 | B1 * | 10/2001 | Matyas et al. | 380/44 |
| 6,836,784 | B2 * | 12/2004 | Perkins | 708/491 |
| 7,043,018 | B1 * | 5/2006 | Kasahara et al. | 380/44 |
| 2002/0186837 | A1 * | 12/2002 | Hopkins et al. | 380/28 |
| 2003/0005005 | A1 * | 1/2003 | Schmidt | 708/250 |
| 2003/0108193 | A1 * | 6/2003 | Sotoodeh | 380/28 |
| 2005/0190912 | A1 * | 9/2005 | Hopkins et al. | 380/44 |

OTHER PUBLICATIONS

Agrawal et al "PRIMES is in P", Annals of Mathematics, 160 (2004) 781-793.*
Kaltofen et al "An Improve Las Vegas Primality Test", 1989 ACM, pp. 26-33.*
"PRIMES is in P" Manindra Agrawal, Neeraj Kayal and Nitin Saxena, http://www.cse.iitk.ac.in/news/primality.html; Aug. 6, 2002.
"Primality Testing with Cyclotomic Rings"; H.W. Lenstra Jr., sent by email,Aug. 13, 2002.
Email with copy of "Primality Testing with Cyclotomic Rings"; sent by H.W. Lenstra Jr., to Maninadra Agrawal and others via email, Aug. 13, 2002.

* cited by examiner

*Primary Examiner*—Tan V. Mai
(74) *Attorney, Agent, or Firm*—William L. Botjer

(57) ABSTRACT

A method and system for generating prime numbers and testing for primality of an integer. This invention has applicability to "public key" and other encryption techniques that play an important role in the security of information technology and electronic commerce. Generation of prime numbers requires the step of testing the pnmality. The method includes a deterministic test for testing the primality of a number in polynomial time. The system includes a random number generator and a primality tester. The random number generator generates a random number and the primality tester tests the primality of this random number. The primality tester can also be used independent of the random number generator. In such a case, the number whose primality is to be tested can be input via a user interface.

12 Claims, 4 Drawing Sheets

POLYNOMIAL TIME DETERMINISTIC METHOD FOR TESTING PRIMALITY OF NUMBERS

BACKGROUND

The present invention relates to a method for testing the primality of numbers. In particular, the present invention relates to a method that deterministically tests whether a given number is prime, in polynomial time. This invention has particular applicability to "public key" and other encryption techniques that play an important role in the security of information technology and electronic commerce.

Prime numbers are positive integers divisible only by themselves and 1. Prime numbers are unique building blocks of all positive integers. Every positive integer greater than one can be expressed uniquely as a product of primes, apart from rearrangement of terms.

Prime numbers have been of interest to mathematicians since ancient times. There have been continuous attempts to identify new prime numbers. Though it is easy to test the primality of small numbers, the problem becomes complex as the number becomes large. Identifying new prime numbers and testing the primality of any given number have been important and challenging mathematical problems.

One of the earliest methods of testing primality is the Sieve of Eratosthenes. This method tests the primality of an integer 'n' by trying to divide the integer 'n' with all prime numbers less than or equal to the square root of 'n'. This method thus involves finding all prime numbers that are less than or equal to the square root of 'n'. Though the Sieve of Eratosthenes provides a deterministic method for testing primality, the time involved in testing increases exponentially with respect to the number of digits (in a given integer).

In seventeenth century, Fermat proved that for any prime number 'p', and any number 'a' not divisible by p, the following equation holds:

$$a^{p-1} = 1 \mod(p)$$

This is known as Fermat's Little Theorem and has been the basis of several primality testing algorithms.

The methods of testing primality have gained further importance with increasing use of encryption in electronic communication. Prime numbers form the basis of most encryption techniques and therefore play an important role in security and cryptography in Information Technology.

Public-key encryption methods such as El Gamal encryption, Elliptic-curve public-key encryption, Diffie-Hellman key exchange and RSA utilize prime numbers. Public-key cryptography is one of the standard forms of encryption for electronic correspondence. The security arising in this type of cryptography primarily relies on the difficulty involved either in factoring very large numbers or computing a discrete logarithm modulo of a large prime.

Various encryption methods such as those given above require large prime numbers in order to produce cryptographic keys, which are used to encipher and decipher data. The larger the prime number (used for generating the encryption key), the more difficult it is to obtain the decryption key from the encryption key and the more secure is the encryption. Thus, generating large prime numbers is one of the key problems associated with cryptography.

Prime numbers involved in encryption are usually very, very large. Testing the primality of such large numbers is a complex task. By way of an example, if the Sieve of Eratosthenes were used to determine the primality of a number with just 20 digits, then it would require one to first find at least all prime numbers up to $10^{10}$. It is believed that there are around 450 million primes less that $10^{10}$. Assuming a rate of finding one prime per second (including elimination of all of its multiples), the time required to find 450 million primes would be around 14 years! These prime numbers will in-turn have to be tested whether they divide the original 20-digit number, to test the primality.

Though the above example provides a deterministic method of testing primality, it has an exponential time complexity, that is, the time taken to come to the decision of primality is bounded by an exponential function, which is dependent on the size of the input number. This limits its use in present day systems for testing primality of large numbers.

Several methods have been developed for the purpose of generating and testing large prime numbers. These methods are either deterministic or randomized. In deterministic methods, the number is declared to be prime or composite with no probability of error.

Since deterministic algorithms take exponential computational time, researchers have tried to develop randomized methods to solve the primality problem. Randomized methods for primality testing are faster than current deterministic methods. However, such methods have an associated probability of error. The probability of errors associated with such methods is inversely proportional to the time required for executing these methods. That is, if the probability of error of such methods were reduced, then the time complexity would increase. Randomized algorithms like Miller-Rabin algorithm may be suitable for many applications, but for sensitive applications like financial transactions and national security, an error-proof method is usually preferable.

There exist patents that have been filed and granted for generating prime numbers and testing the primality of a number. U.S. Pat. No. 6,307,938 entitled "Method, System And Apparatus For Generating Self-Validating Prime Numbers", assigned to International Business Machines Corporation (Armonk, N.Y., USA), and filed on Jul. 10, 1998, describes one such method for generating prime numbers for use in cryptography. This method provides an encoding method that permits secret seed values to be encoded into the generated prime numbers. The method generates suitable seed numbers, which are then used for generating prime numbers using standard methods.

U.S. patent application Ser. No. 20030108193, entitled "Key Generation Performance Improvement", assigned to Howard Hughes Center (CA, USA), and filed on Oct. 29, 2002, describes a method and apparatus for generation of large prime numbers for use in a cryptographic system. The method described in this patent application uses a "mod remainder" based approach for generating prime numbers in conjunction with standard primality testing methods like Fermat's Little Theorem. For a prime number, the mod remainders cannot be zero. This method creates and maintains a table of mod remainders (for all primes less than a defined range) for a number. If all the mod remainders in the table are non-zero, then the number is further tested for primality by standard primality testing methods.

Most of the above-mentioned methods either have a high time complexity, or there is a small chance of the answer being incorrect. In other words, either the methods are probabilistic or are super-polynomial in time, that is, the time taken to come to the decision of primality cannot be bounded by any polynomial function.

Accordingly, what is required is a method for testing primality that has polynomial time complexity and is also deterministic. The term polynomial time means that the time taken to come to the decision of primality is bounded by a polynomial, which is dependent on the size of the input number.

SUMMARY

It is an object of the disclosed invention to provide a method and system for generating prime numbers.

Another object of the disclosed invention is to provide a method and system for generating prime numbers for use in cryptography.

Another object of the disclosed invention is to provide a method and system for deterministically testing the primality of numbers in polynomial time.

Another object of the disclosed invention is to provide a method and system for deterministically testing the primality of numbers in polynomial time for use in a prime number generator.

Yet another object of the disclosed invention is to provide a method and system for deterministically testing the primality of numbers in polynomial time for use in cryptography.

To achieve the objects mentioned above, the disclosed invention provides a prime number generator. The prime number generator comprises a random number generator and a primality tester. The disclosed invention works as follows. The random number generator generates a large integer. This number is input to the primality tester that tests the primality of the number (in other words, the primality tester determines whether the number is prime or composite). The primality tester performs this test deterministically and in polynomial time with respect to the number of digits of the integer.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The disclosed invention is related to generation of prime numbers. Generation of prime number involves generation of a random number, which is subsequently tested for primality. The disclosed invention presents a method of testing the primality of a number deterministically in polynomial time. Here, the term deterministically means that the number is declared to be prime or composite with no probability of error. Further, the term polynomial time means that the time taken to come to the decision of primality is bounded by a polynomial, which is dependent on the size of the input number.

Figure 1:
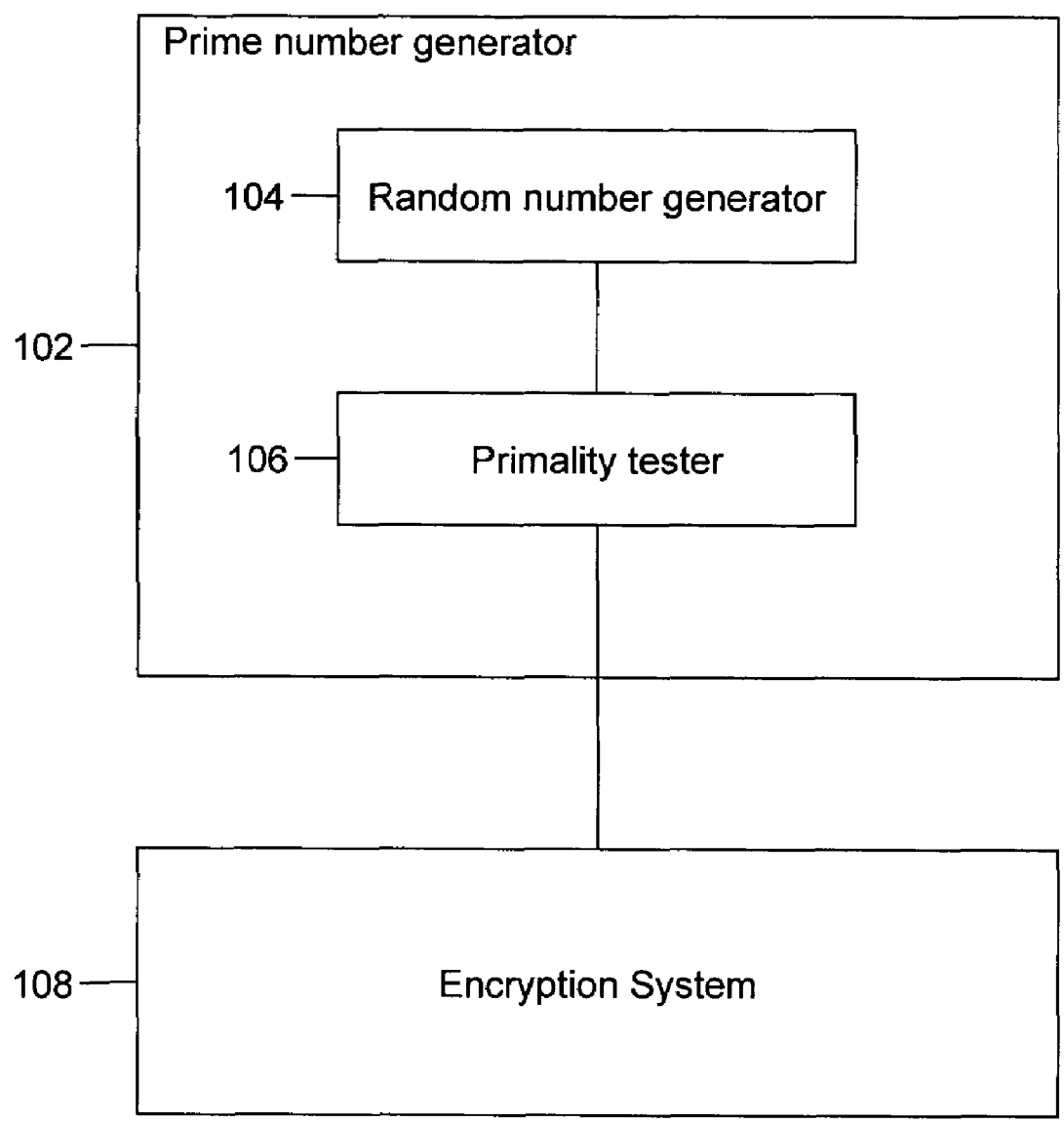
FIG. 1 illustrates a prime number generator interacting with an encryption system according to an embodiment of the disclosed invention.

FIG. 1 illustrates a prime number generator 102 interacting with an encryption system 108 according to an embodiment of the disclosed invention. Prime number generator 102 comprises a random number generator 104 and a primality tester 106. Random number generator 104 generates positive integers and is connected to primality tester 106. Further, prime number generator 102 is connected to encryption system 108 that uses prime numbers generated by prime number generator 102. Encryption system 108 mentioned above can be any system that performs encryption of data for computer security or secure electronic communication.

The following paragraphs describe are exemplary encryption systems in which prime number generator 102 finds use.

Prime number generator 102 can be used in conjunction with the RSA public-key encryption algorithm. This encryption algorithm was proposed in 1978 by Rivest, Shamir, and Adleman. This is used in public-key encryption and digital signature applications. For example, it is used in most public-key infrastructures securing transactions taking place over the Internet. The algorithm has a public key, consisting of two numbers 'n' and 'e', and a private-key, consisting of a number 'd'. Number 'n' is a product of two large prime numbers, 'p' and 'q'. These prime numbers can be generated using prime number generator 102.

Prime number generator 102 can also be used in the Diffie-Hellman key exchange mechanism. This is a key-exchange mechanism based on public keys. For example, when a large amount of data needs to be securely exchanged between two parties, then first the parties agree on a key for the private-key encryption algorithm by using the Diffie-Hellman scheme and then exchange the data by encrypting it using the private-key algorithm. This is done, for example, in SSH (Secure Shell) interface and protocol where the Diffie-Heliman scheme is used in conjunction with DES (Data Encryption Standard). Diffie-Hellman public-key uses a pair of numbers 'x' and 'p', where 'p' is a large prime number. Prime number generator 102 can be used to generate 'p'.

Further, there are several public-key encryption algorithms based on elliptic-curves. These algorithms have a smaller key size than RSA for the same security guarantees and therefore are useful in small devices, for example, smart cards. All the elliptic-curves used are defined over a large finite field. Often, this field is taken to be GF [p], which is the set of numbers modulo prime 'p'. This requires a large prime 'p' that can be generated using prime number generator 102.

A positive integer generated by random number generator 104 is input to primality tester 106, which tests the primality of the integer deterministically and in polynomial time. The method implemented by primality tester 106 is described later in conjunction with FIG. 2, FIG. 3a and FIG. 3b. Primality tester 106 determines whether the input number is prime or not and outputs the result accordingly.

Figure 2:
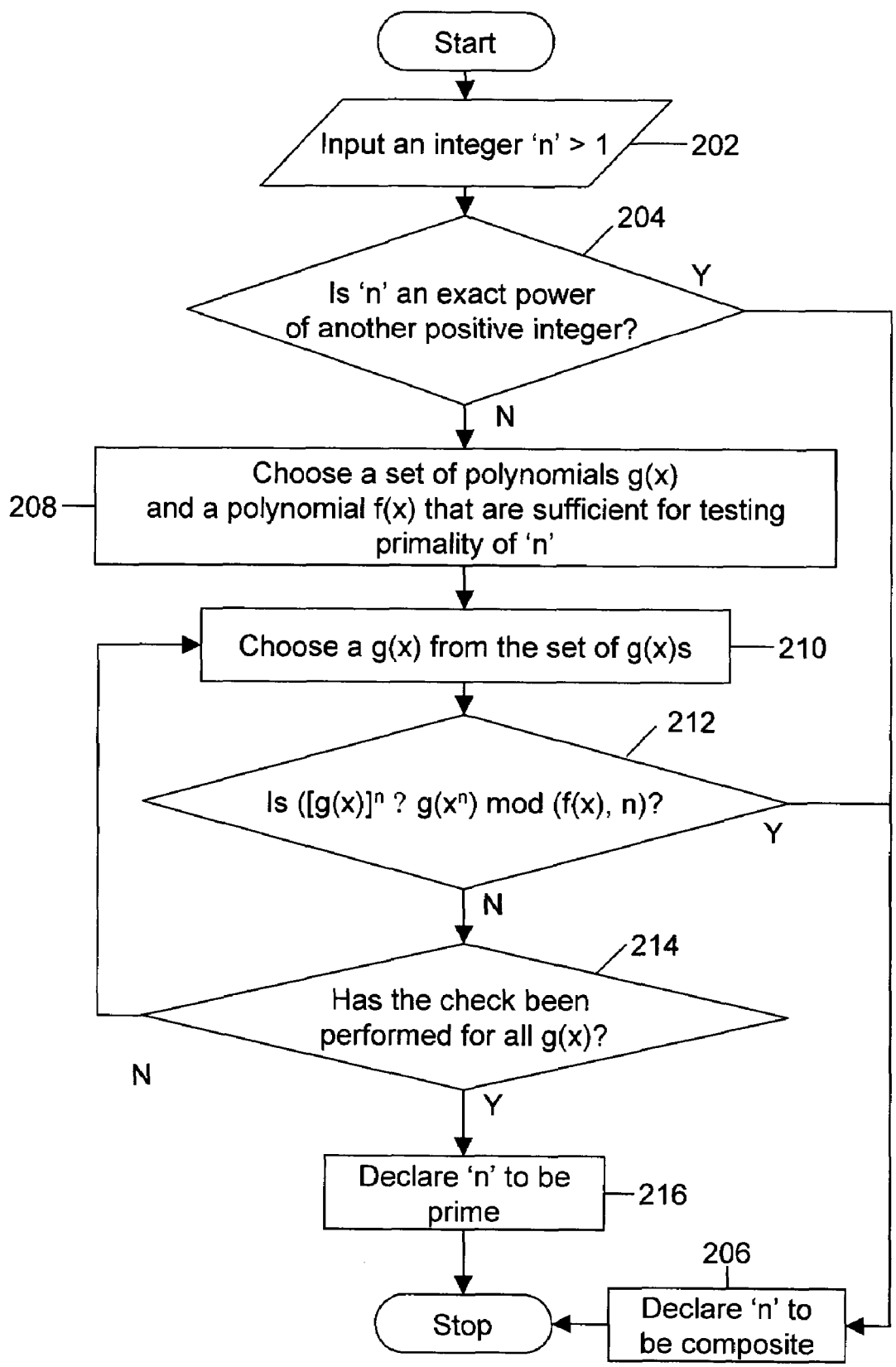
FIG. 2 is a flowchart that illustrates the essential steps of testing the primality of a number according to a generalized embodiment of the disclosed invention; and FIG. 3a and FIG. 3b is a flowchart that illustrates the detailed steps of testing the primality of a number according to a specific embodiment of the disclosed invention.

FIG. 2 is a flowchart that illustrates the essential steps of testing the primality of an integer according to a generalized embodiment of the disclosed invention. At step 202, an integer 'n' greater than 1 is input to primality tester 106. In an embodiment of the disclosed invention, random number generator 104 generates this integer. It would be evident to one skilled in the art that the integer input to primality tester 106 may be provided by a user via a user interface instead of a random number generator. Similarly, the input integer may be provided by any other system coupled to primality tester 206.

The test for primality can be divided into two stages. In the first stage, primality tester 106 performs a check to determine whether the integer 'n' is an exact power of another positive integer, as shown in step 204. In the second stage, primality tester 106 performs an "extension ring test". Steps 208 to 214 illustrate the extension ring test.

At step 204, primality tester 106 tests whether the integer 'n' can be expressed in the following form or not:

$$n = a^b \qquad (1)$$

where 'a' and 'b' are integers greater than 1.

If at step 204 the integer 'n' is found to be an exact power of another positive integer, then the integer 'n' is declared to be composite at step 206, and the process ends subsequently. There are several algorithms, well known in the art, which can be used to check the condition as required at step 204. The pseudo-code of a possible implementation is given below:

```
IsPower (n)
    1.  for b = 2 to (log n)
    2.      If( IsBthPower(n, b) ) output YES;
    3.  output NO;
IsBthPower(n, b)
    1.  alow := 1, aup:= n;
    2.  while( alow < aup )
    3.      amid := (alow + aup)/2;
    4.      mpow := amid ^ b;
    5.      if( mpow==n ) output YES;
    6.      else if( mpow<n ) alow := amid + 1;
    7.      else aup := amid − 1;
    8.  return NO;
```

However, if at step 204, the integer 'n' is not found to be an exact power of another number, the extension ring test is performed.

The "extension ring test" is based on the following equation:

$$[g(x)]^n = g(x^n) \bmod (f(x), n) \qquad (2)$$

where the mod function is defined as follows:

$$a(x) = b(x) \bmod (c(x), d(x))$$

where c(x) and d(x) are factors of (a(x)−b(x)); a(x), b(x), c(x) and d(x) being polynomials in 'x', where x is any variable.

An integer 'n' is prime if the above equation holds true for all g(x) and a suitably chosen f(x). The mathematical proof of the above-described equation can be found in a research paper authored by the inventors of the disclosed invention. The paper titled "PRIMES is in P" was published by Manindra Agrawal, Neeraj Kayal and Nitin Saxena, on the website http://www.cse.iitk.ac.in/news/primality.html on Aug. 06, 2002. This paper is not admitted as effective prior art as the present patent application has been filed within one year of disclosure of the paper.

At step 208, primality tester 106 chooses a set of polynomials g(x) and a polynomial f(x) that are sufficient for testing primality of the integer 'n'. The conditions that need to be satisfied by the polynomial f(x) are as follows:

1. f(x) is monic, that is, its leading coefficient is unity and its degree 'd' is greater than or equal to $(\log_2 n)^2$;
2. $f(x^n) = 0 \bmod (n, f(x))$; and
3. f(x) is co-prime to $x^{(n^{(d/l)})} - x \bmod (n)$ for each prime 'l' dividing 'd', where (a^b) represents 'a' raised to the exponent 'b'.

Any polynomial f(x) that satisfies the above-mentioned conditions can be used in the disclosed invention. However, the choice of the function f(x) and the set of polynomials g(x) affects the time complexity of the method.

In an embodiment, the set of polynomials g(x) is chosen to be a set of linear polynomials. The set of polynomials g(x) is chosen so as to contain as many polynomials as are sufficient for determining primality of the integer 'n'. By way of an example, if g(x) is chosen to be of the form (x+a), then the set of polynomials g(x) as mentioned above includes all the values of 'a' for which, the check of step 212 when performed for all g(x)s in this set is sufficient to determine primality of the integer 'n'. The method of finding the set of polynomials that is sufficient for testing the primality of the integer 'n' is described later.

At step 210, primality tester 106 chooses one polynomial from the set of polynomials g(x). At step 212, the following check is performed:

$$[g(x)]^n \neq g(x^n) \bmod (f(x), n) \qquad (3)$$

If the above condition (equation 3) holds for the polynomial g(x) chosen at step 210, then the integer 'n' is declared to be composite at step 206.

However, if the condition in step 212 does not hold, then at step 214, it is checked if all the polynomials belonging to the set of polynomials g(x) have been checked for the condition in step 212. If there are some polynomials belonging to the set of g(x) that are not checked for the condition in step 212, then steps 210 to 214 are repeated until the condition at step 214 becomes true or the integer 'n' is declared to be composite. When the condition at step 214 becomes true, the integer 'n' is declared to be prime at step 216.

Step 208 is used to find the set of polynomials g(x), as described above. This is further explained with the help of steps 310 to 330 in conjunction with FIG. 3a and FIG. 3b. After the set of polynomials g(x) is found, the extension ring test is performed. This is described above in steps 208 to 214. The same set of steps is also described in greater details with specific examples of the set of polynomials g(x) and a polynomial f(x) in steps 310 to 338 in conjunction with FIG. 3a and FIG. 3b.

Figure 3A:
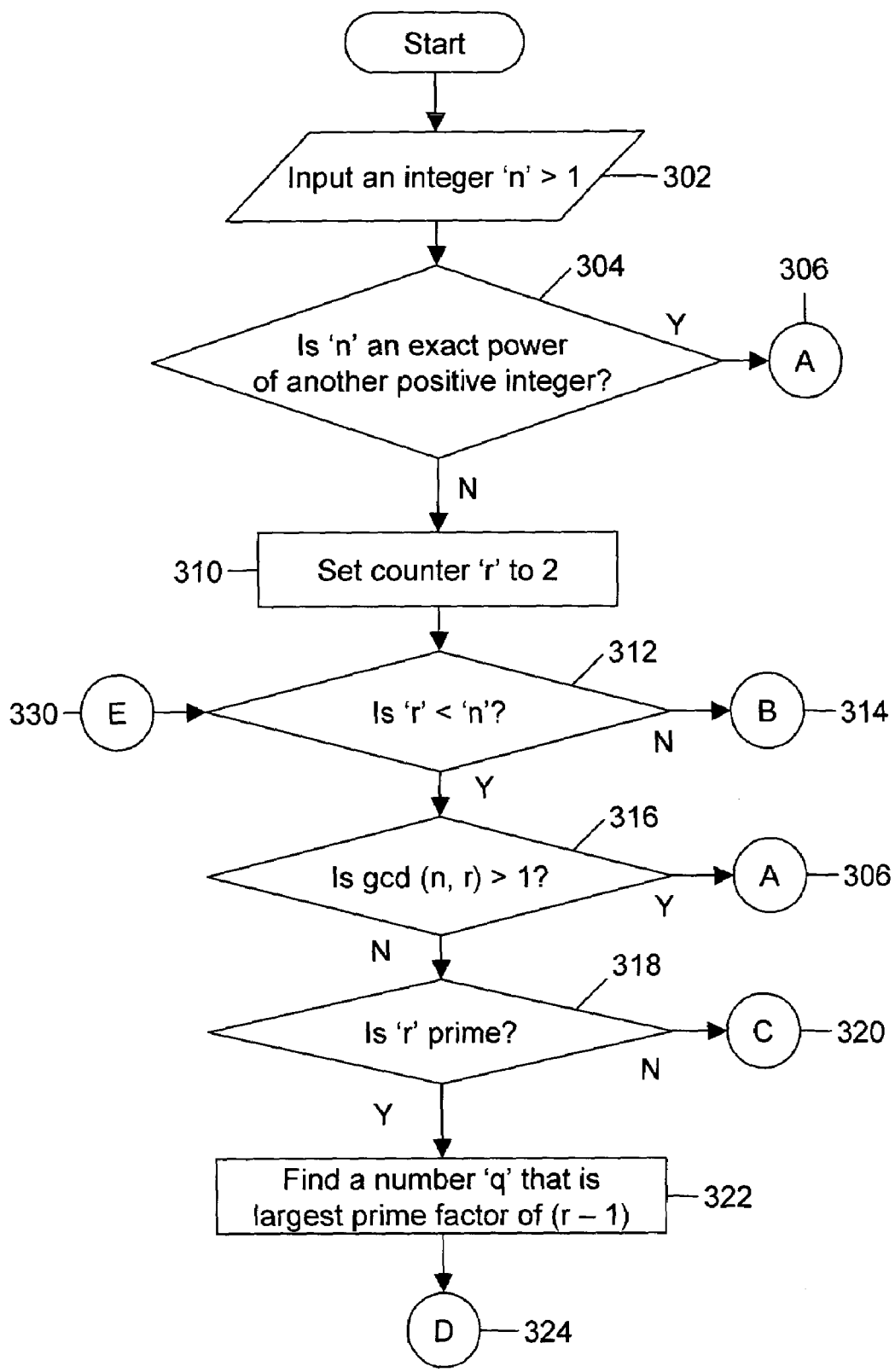
Figure 3B:
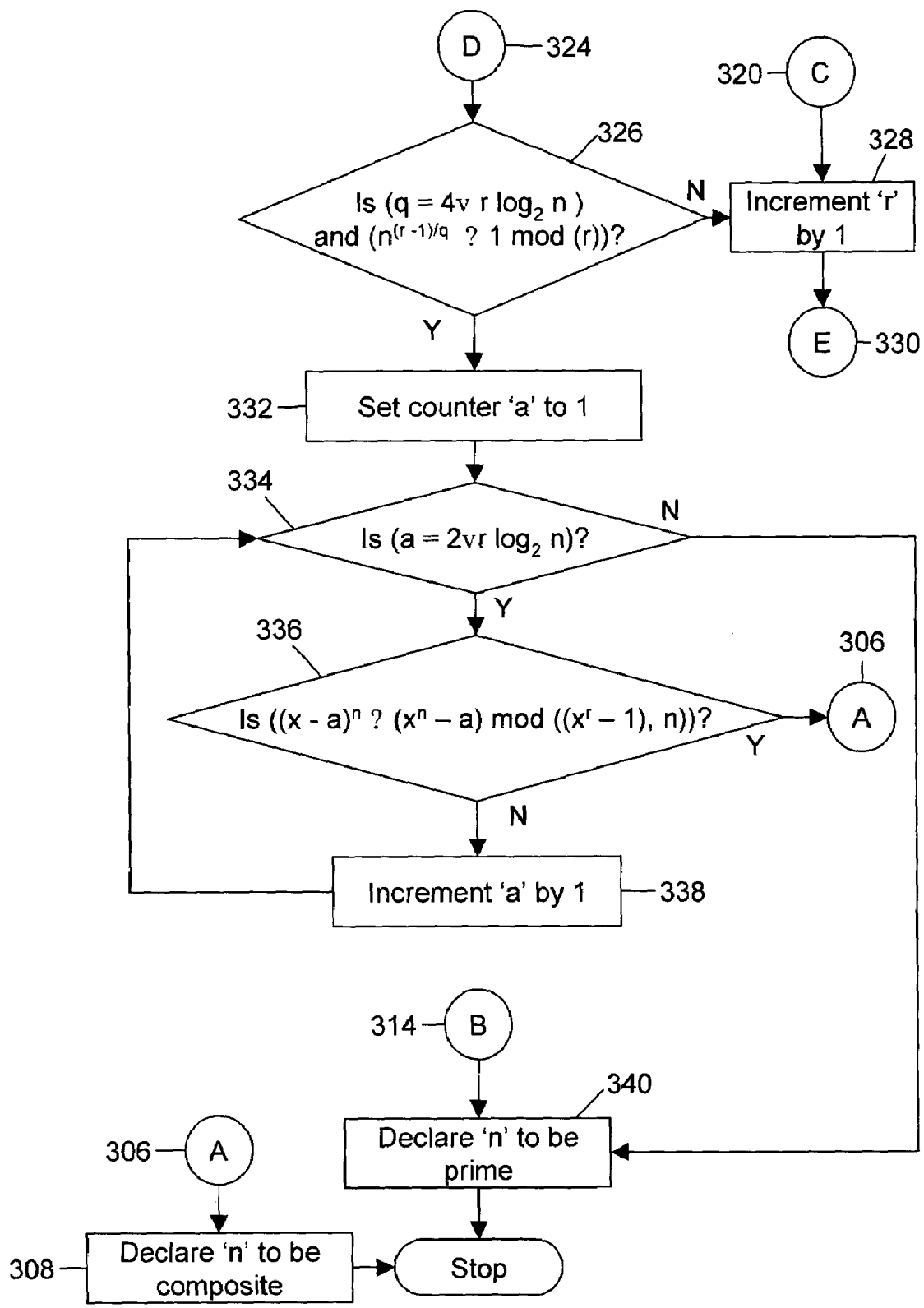

FIG. 3a and FIG. 3b is a flowchart that illustrates the detailed steps of testing the primality of a number according to a specific embodiment of the disclosed invention. The method of primality testing has been elaborated upon with the help of suitable f(x) and g(x). The conditions required to be satisfied by the polynomial f(x) are the same as those described in FIG. 2.

In an embodiment, the following f(x) and g(x) are used:

$$g(x) = x - a;$$

where

"x" is any variable and 'a' is a set of integers, the range of 'a' is determined as described below; and $$f(X) = X^r - 1.$$

where

"x" is any variable; and 'r' is a variable dependent upon the integer 'n' and is determined as described below.

Steps 302 and 304 of FIG. 3a are same as steps 202 and 204 of FIG. 2. At step 304, primality tester 106 performs a check to determine whether 'n' is an exact power of another positive integer. If at step 304, the integer 'n' is not found to be an exact power of another number, then the extension ring test is performed as illustrated by steps 310 to 338.

Hereinafter, the extension ring test has been illustrated with the help of above-mentioned f(x) and set of polynomials g(x).

Primality tester 106 determines the value of 'r' in steps 312 to 330. It has been proved that there exists a sufficiently small prime number 'r' that is less than c $(\log_2 n)^6$ for 'n'>'$n_0$' and satisfies the following conditions:

1. gcd(n,r)=1;
2. Largest prime factor 'q' of (r−1) is such that $q > 4\sqrt{r} \log_2 n$; and
3. $n^{(r-1)/q} \neq 1 \mod(r)$;

where 'c' and '$n_0$' are constants. The proof for the above can be found in the research paper titled "PRIMES is in P" as referred above.

At step 310, a counter 'r' is initialized to 2. At step 312, a check is performed to see if the counter 'r' is less than the integer 'n'. If the counter 'r' is not less than the integer 'n', the integer 'n' is declared prime at step 340. If the counter 'r' is less than the integer 'n', step 316 is performed. At step 316, it is checked whether:

$$gcd(n, r) > 1 \quad (4)$$

where gcd (n,r) represents the greatest common divisor of the integer 'n' and the counter 'r'.

The greatest common divisor can be computed by several methods well known in the prior art. One such method of computation of the greatest common divisor is presented on page 49 of the book titled "Modern Computer Algebra", authored by Joachim von zur Gathen and Jurgen Gerhard, and published by Cambridge University Press, 1999. If the condition of step 316 is true, the integer 'n' is declared to be composite at step 308.

If the condition at step 316 is false, it is checked whether the counter 'r' is prime or not at step 318. The value of the counter 'r' is sufficiently small compared to the integer 'n'. It is shown that the value of the counter 'r' is less than c $(\log_2 n)^6$, in the research paper titled "PRIMES is in P" as referred above. As the counter 'r' is significantly small compared to the integer 'n', the time required to test the primality of the counter 'r' is not large enough to affect the time taken by the method for testing the primality of the integer 'n'. Any method well known in the art for testing primality can be used for this purpose. In an embodiment, the method proposed in the Sieve of Eratosthenes is used. If the counter 'r' is not a prime, the counter 'r' is incremented by unity at step 328. Thereafter, step 312 is repeated.

If the counter 'r' is a prime, then at step 322, a number 'q', which is the largest prime factor of (r−1), is determined. At step 326, the following conditions are checked:

$$q > 4\sqrt{r} \log_2 n \quad (5)$$

$$n^{(r-1)/q} \neq 1 \mod(r) \quad (6)$$

If either of the above conditions (5 and 6) is not true, then at step 328, the counter 'r' is incremented by unity and step 312 is repeated. If both the above conditions (5 and 6) are true, then this value of counter 'r' is used for further processing. Equation 5 involves computation of square root and logarithm of a number. One possible method of performing the computation is presented in the book by D. E. Knuth titled "The Art of Computer Programming, Vol. II, Seminumerical Algorithms" and published by Addison Wesley, 1998. Equation 6 involves modular exponentiation. One possible method of performing the computation is presented in the book by Joachim von zur Gathen and Jurgen Gerhard titled "Modern Computer Algebra" published by Cambridge University Press, 1999 on page 69.

The value of counter 'a' lies between 1 and $(2\sqrt{r} \log_2 n)$. The proof for this can be found in the research paper titled "PRIMES is in P" as referred above.

From step 334 to step 338, primality tester 106 checks if the equation:

$$[g(x)]^n = g(x^n) \mod(f(x), n) \quad (2)$$

holds for the chosen f(x) and all g(x) belonging to the set of polynomials g(x) in steps 334 to 338.

At step 332, the counter 'a' is initialized to unity. Further, at step 334, it is checked whether the counter 'a' is less than or equal to $(2\sqrt{r} \log_2 n)$. If the condition at step 334 is true, at step 336, the check as in equation 3 is performed with:

$$g(x) = x - a; \text{ and}$$

$$f(x) = x^r - 1.$$

If the condition is true, then the integer 'n' is declared to be composite at step 308. If the condition is not true, then at step 338, the counter 'a' is incremented by unity and the check of step 334 is performed again. When the check of step 336 has been performed for all 'a' less than or equal to $(2\sqrt{r} \log_2 n)$ (that is, when the condition at step 334 is not true) the integer 'n' is declared to be prime at step 340. Step 336 involves the expansion of powers of the polynomial g(x) and performing the mod f(x) operation as in equation 3. This may be implemented using FFT (Fast Fourier Transform) algorithms that are well known in the art. One possible method of performing the FFT computation is presented in the book by Joachim von zur Gathen and Jurgen Gerhard titled "Modern Computer Algebra" published by Cambridge University Press, 1999 in Chapter 8 on page 209.

The method as described above deterministically provides whether the integer 'n' is a prime or a composite. If the number is found to be composite, then another random number is input to primality tester 106. This integer is again input to primality tester 106. Primality tester 106 repeats the process and tests the new input number for primality.

The following pseudo-code may be used to implement the method described above:

```
Input: integer n > 1
  1.  if(n is of the form a^b, b > 1 )
  2.    output COMPOSITE;
  3.  r = 2;
  4.  while(r < n){
  5.    if ( gcd(n,r) ≠ 1 ) output COMPOSITE;
  6.    if (r is prime)
  7.      let q be the largest prime factor of r − 1;
  8.      if (q ≥ 4√r log_2 n)and(n^((r−1)/q) ≠ 1 mod (r)
  9.        break;
  10.   r ← r + 1;
  11. }
  12. for a = 1 to (2√r log_2 n)
  13.   if ( (x − a)^n ≠ (x^n − a) mod (x^r − 1, n))
  14.     output COMPOSITE;
  15. output PRIME;
```

Primality tester 106 tests the primality of an integer 'n' in polynomial time. The asymptotic time complexity of the method is $\tilde{O}(\log_2^{12} n)$, where $\tilde{O}(t(n))$ stands for $O(t(n) \text{poly}(\log_2(t(n))))$, t(n) being a function of n. Step 1 in the pseudo code has an asymptotic time complexity of $O(\log_2^3 n)$. The total asymptotic time complexity of the 'while' loop is $\tilde{O}(r^{1/2} \cdot (\log_2^6 n)) = \tilde{O}(\log_2^9 n)$. The 'for' loop performs modular computation over polynomials. If repeated squaring and Fast Fourier Multiplication is used, one iteration of the 'for' loop has an asymptotic time complexity of $\tilde{O}(r^{3/2} \cdot (\log_2 n)) = \tilde{O}(\log_2^{12} n)$.

Prime number generator 102 can be used in any application that requires generation of large prime numbers. It will be evident to one skilled in the art that the utility of prime number generator 102 is not limited to the encryption systems mentioned as examples previously.

The prime number generator, as described in the disclosed invention or any of its components may be embodied in the form of a processing machine. Typical examples of a processing machine include a general purpose computer, a programmed microprocessor, a micro-controller, a peripheral integrated circuit element, and other devices or arrangements of devices, which are capable of implementing the steps that constitute the method of the disclosed invention.

The processing machine executes a set of instructions that are stored in one or more storage elements, in order to test the primality of a randomly generated number. The storage elements may also hold data or other information as desired. The storage element may be in the form of a database or a physical memory element present in the processing machine.

The set of instructions may include various instructions that instruct the processing machine to perform the steps that constitute the method of generation of prime numbers. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include connection of the processing machines and/or storage elements, in the form of a network. The network can be an intranet, an extranet, the Internet or any client server models that enable communication. Such communication technologies may use various protocols such as TCP/IP, UDP, ATM or OSI.

In the system and the method of the disclosed invention, a variety of "user interfaces" may be utilized to allow a user to interface with the processing machine or machines that are used to implement the disclosed invention. The user interface is used by the processing machine to interact with a user in order to convey or receive information. The user interface could be any hardware, software, or a combination of hardware and software used by the processing machine that allows a user to interact with the processing machine. The user interface may be in the form of a dialogue screen and may include various associated devices to enable communication between a user and a processing machine. It is contemplated that the user interface might interact with another processing machine rather than a human user. Further, it is also contemplated that the user interface may interact partially with other processing machines while also interacting partially with the human user.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for generating prime numbers for use in encryption, the method comprising the steps of:
   a. generating a random number 'n';
   b. checking if the random number 'n' is an exact power of another positive integer;
   if the random number 'n' is an exact power of the another positive integer, then:
   c. declaring the random number 'n' to be composite;
   if the random number 'n' is not an exact power of the another positive integer, then:
   d. performing an extension ring test on the random number 'n'; and
   e. providing the random number 'n' to an encryption system, based on the result of the extension ring test.

2. The method as recited in claim 1 wherein the step of performing the extension ring test comprises the steps of:
   a. choosing a set of polynomials g(x);
   b. choosing a polynomial f(x);
   if $[g(x)]^n \neq g(x^n) \mod(f(x), n)$, for the chosen f(x) and any g(x) belonging to the chosen set of polynomials g(x) then:
   c. declaring the random number 'n' to be composite; and
   if $[g(x)]^n = g(x^n) \mod(f(x), n)$, for the chosen f(x) and all g(x) belonging to the chosen set of polynomials g(x) then:
   d. declaring the random number 'n' to be prime.

3. The method as recited in claim 1 wherein the step of performing the extension ring test comprises the steps of:
   a. determining the smallest number 'r' less than the random number 'n', the number 'r' satisfying the following conditions:
      i. the number 'r' is a prime number;
      ii. the largest prime factor 'q' of (r−1) is greater than or equal to $(4\sqrt{r} \log_2 n)$;
      iii. $n^{(r-1)/q} \neq 1 \mod (r)$; and
      iv. the greatest common divisor of the number 'r' and the random number 'n' is equal to 1;
   if no number 'r' satisfying all the conditions specified in step a exists, then for all values of the number 'r' less than the random number 'n':
   b. performing a check whether the greatest common divisor of the number 'r' and the random number 'n' is greater than 1;
   if the greatest common divisor of 'r' and 'n' is greater than 1 for any value of the number 'r', then:
      i. declaring the number 'n' to be composite;
   if the greatest common divisor of 'r' and 'n' is equal to 1 for all values of the number 'r', then:
      ii. declaring the number 'n' to be prime; and
   if a number 'r' satisfying the conditions specified in step a exists, then:
   c. checking whether $(x \times a)^n = x^n + a \mod (n, x^r - 1)$ for all integer values of 'a' from 1 to $(2\sqrt{r} \log_2 n)$;
   if $(x+a)^n \neq x^n + a \mod (n, x^r - 1)$ for any integer value of 'a' between 1 and $(2\sqrt{r} \log_2 n)$, then:
      i. declaring the number 'n' to be composite; and if $(x+a)^n = x^n + a \bmod (n, x^r - 1)$ for all integer values of 'a' from 1 to $(2\sqrt{r} \log_2 n)$, then:
  ii. declaring the random number 'n' to be prime.

4. A method for generating prime numbers for use in encryption, the method comprising the steps of:
  a. generating a random number 'n';
  b. checking if the random number 'n' is an exact power of another positive integer;
  if the random number 'n' is an exact power of the another positive integer, then:
  c. declaring the random number 'n' to be composite;
  if the random number 'n' is not an exact power of the another positive integer, then:
  d. performing an extension ring test, the extension ring test comprising:
    i. determining the smallest number 'r' less than the random number 'n', the number 'r' satisfying the following conditions:
      1. the number 'r' is a prime number;
      2. the largest prime factor 'q' of (r−1) is greater than or equal to $(4\sqrt{r} \log_2 n)$;
      3. $n^{(r-1)/q} \neq 1 \bmod (r)$; and
      4. the greatest common divisor of the number 'r' and the random number 'n' is equal to 1;
    if no number 'r' satisfying all the conditions specified in step i exists, then for all values of the number 'r' less than the random number 'n':
    ii. performing a check whether the greatest common divisor of the number 'r' and the random number 'n' is greater than 1; and
    if the greatest common divisor of 'r' and 'n' is greater than 1 for any value of the number 'r', then:
      1. declaring the number 'n' to be composite; and
    if the greatest common divisor of 'r' and 'n' is equal to 1 for all values of the number 'r', then:
      2. declaring the number 'n' to be prime;
    if a number 'r' satisfying the conditions specified in step i exists, then:
    iii. checking whether $(x+a)^n = x^n + a \bmod (n, x^r - 1)$ for all integer values of 'a' from 1 to $(2\sqrt{r} \log_2 n)$;
    if $(x+a)^n \neq x^n + a \bmod (n, x^r - 1)$ for any integer value of 'a' between 1 and $(2\sqrt{r} \log_2 n)$, then:
      1. declaring the number 'n' to be composite; and
    if $(x+a)^n = x^n + a \bmod (n, x^r - 1)$ for all integer values of 'a' from 1 to $(2\sqrt{r} \log_2 n)$, then:
      2. declaring the random number 'n' to be prime; and
  e. providing the random number 'n' to an encryption system if the random number 'n' is declared to be prime in the extension ring test.

5. A method for deterministically testing primality of a random number 'n' in polynomial time for use in encryption, the method comprising the steps of:
  a. checking if the random number 'n' is an exact power of another positive integer;
  if the random number 'n' is an exact power of the another positive integer, then:
  b. declaring the random number 'n' to be composite;
  if the random number 'n' is not an exact power of the another positive integer, then:
  c. performing an extension ring test; and
  d. providing the random number 'n' to an encryption system, based on the result of the extension ring test.

6. The method as recited in claim 5 wherein the step of performing the extension ring test comprises the steps of:
  a. choosing a set of polynomials g(x);
  b. choosing a polynomial f(x);
  if $[g(x)]^n \neq g(x^n) \bmod(f(x), n)$, for the chosen f(x) and any g(x) belonging to the chosen set of polynomials g(x) then:
  c. declaring the random number 'n' to be composite; and
  if $[g(x)]^n = g(x^n) \bmod(f(x), n)$, for the chosen f(x) and all g(x) belonging to the chosen set of polynomials g(x) then:
  d. declaring the random number 'n' to be prime.

7. The method as recited in claim 5 wherein the step of performing the extension ring test comprises the steps of:
  a. determining the smallest number 'r' less than the random number 'n', the number 'r' satisfying the following conditions:
    i. the number 'r' is a prime number;
    ii. the largest prime factor 'q' of (r−1) is greater than or equal to $(4\sqrt{r} \log_2 n)$;
    iii. $n^{(r-1)/q} \neq 1 \bmod (r)$; and
    iv. the greatest common divisor of the number 'r' and the random number 'n' is equal to 1;
  if no number 'r' satisfying all the conditions specified in step a exists, then for all values of the number 'r' less than the random number 'n':
  b. performing a check whether the greatest common divisor of the number 'r' and the random number 'n' is greater than 1; and
  if the greatest common divisor of 'r' and 'n' is greater than 1 for any value of the number 'r', then:
    i. declaring the number 'n' to be composite; and
  if the greatest common divisor of 'r' and 'n' is equal to 1 for all values of the number 'r', then:
    ii. declaring the number 'n' to be prime;
  if a number 'r' satisfying the conditions specified in step a exists, then:
  c. checking whether $(x+a)^n = x^n + a \bmod (n, x^r - 1)$ for all integer values of 'a' from 1 to $(2\sqrt{r} \log_2 n)$;
  if $(x+a)^n \neq x^n + a \bmod (n, x^r - 1)$ for any integer value of 'a' between 1 and $(2\sqrt{r} \log_2 n)$, then:
    i. declaring the number 'n' to be composite; and
  if $(x+a)^n = x^n + a \bmod (n, x^r - 1)$ for all integer values of 'a' from 1 to $(2\sqrt{r} \log_2 n)$, then:
    ii. declaring the random number 'n' to be prime.

8. A method for deterministically testing primality of a random number 'n' in polynomial time for use in encryption, the method comprising the steps of:
  a. checking if the random number 'n' is an exact power of another positive integer;
  if the random number 'n' is an exact power of the another positive integer, then:
  b. declaring the random number 'n' to be composite;
  if the random number 'n' is not an exact power of the another positive integer, then:
  c. performing an extension ring test, the extension ring test comprising:
    i. determining the smallest number 'r' less than the random number 'n', the number 'r' satisfying the following conditions:
      1. the number 'r' is a prime number;
      2. the largest prime factor 'q' of (r−1) is greater than or equal to $(4\sqrt{r} \log_2 n)$;
      3. $n^{(r-1)/q} \neq 1 \bmod (r)$; and
      4. the greatest common divisor of the number 'r' and the random number 'n' is equal to 1;
    if no number 'r' satisfying all the conditions specified in step i exists, then for all values of the number 'r' less than the random number 'n':

ii. performing a check whether the greatest common divisor of the number 'r' and the random number 'n' is greater than 1; and
   if the greatest common divisor of 'r' and 'n' is greater than 1 for any value of the number 'r', then:
   1. declaring the number 'n' to be composite; and
   if the greatest common divisor of 'r' and 'n' is equal to 1 for all values of the number 'r', then:
   2. declaring the number 'n' to be prime; and
if a number 'r' satisfying the conditions specified in step i exists, then:
iii. checking whether $(x+a)^n = x^n + a \mod (n, x^r-1)$ for all integer values of 'a' from 1 to $(2\sqrt{r} \log_2 n)$;
   if $(x+a)^n \neq x^n + a \mod (n, x^r-1)$ for any integer value of 'a' between 1 and $(2\sqrt{r} \log_2 n)$, then:
   1. declaring the number 'n' to be composite; and
   if $(x+a)^n = x^n + a \mod (n, x^r-1)$ for all integer values of 'a' from 1 to $(2\sqrt{r} \log_2 n)$, then:
   2. declaring the random number 'n' to be prime; and
d. providing the random number 'n' to an encryption system if the random number 'n' is declared to be prime in the extension ring test.

9. A primality tester for deterministically testing primality of a random number 'n' in polynomial time by performing an extension ring test, for use in encryption, the primality tester comprising:
   a. means for determining the smallest number 'r' less than the random number 'n', the number 'r' satisfying the following conditions:
      i. the number 'r' is a prime number;
      ii. the largest prime factor 'q' of (r-1) is greater than or equal to $(4\sqrt{r} \log_2 n)$;
      iii. $n^{(r-1)/q} \neq 1 \mod (r)$; and
      iv. the greatest common divisor of the number 'r' and the random number 'n' is equal to 1;
   if no number 'r' satisfying all the conditions specified in step a exists, then for all values of the number 'r' less than the random number 'n':
   b. means for performing a check whether the greatest common divisor of the number 'r' and the random number 'n' is greater than 1; and
   if the greatest common divisor of 'r' and 'n' is greater than 1 for any value of the number 'r', then:
      i. declaring the number 'n' to be composite; and
   if the greatest common divisor of 'r' and 'n' is equal to 1 for all values of the number 'r', then:
      ii. declaring the number 'n' to be prime;
   if a number 'r' satisfying the conditions specified in step a exists, then:
   c. means for checking whether $(x+a)^n = x^n + a \mod (n, x^r-1)$ for all integer values of 'a' from 1 to $(2\sqrt{r} \log_2 n)$;
      if $(x+a)^n \neq x^n + a \mod (n, x^r-1)$ for any integer value of 'a' between 1 and $(2\sqrt{r} \log_2 n)$, then:
         i. declaring the number 'n' to be composite; and
      if $(x+a)^n = x^n + a \mod (n, x^r-1)$ for all integer values of 'a' from 1 to $(2\sqrt{r} \log_2 n)$, then:
         ii. declaring the random number 'n' to be prime.

10. A prime number generator, the prime number generator being connected to an encryption system, the encryption system using prime numbers generated by the prime number generator in encryption, the prime number generator comprising:
   a. a random number generator the random number generator generating a random number 'n'; and
   b. a primality tester, the primality tester performing an extension ring test on the random number 'n' so as to determine whether the random number 'n' is prime, wherein the primality tester comprises:
      i. means for determining the smallest number 'r' less than the random number 'n', the number 'r' satisfying the following conditions:
         i.i. the number 'r' is a prime number:
         i.ii. the largest prime factor 'q' of (r-1) is greater than or equal to $(4\sqrt{r} \log_2 n)$;
         i.iii. $n^{(r-1)/q} \neq 1 \mod (r)$; and
         i.iv. the greatest common divisor of the number 'r' and the random number 'n' is equal to 1;
      if no number 'r' satisfying all the conditions specified in step a exists, then for all values of the number 'r' less than the random number 'n':
      ii. means for performing a check whether the greatest common divisor of the number 'r' and the random number 'n' is greater than 1; and
      if the greatest common divisor of 'r' and 'n' is greater than 1 for any value of the number 'r', then:
         ii.i. declaring the number 'n' to be composite; and
      if the greatest common divisor of 'r' and 'n' is equal to 1 for all values of the number 'r', then:
         ii.ii. declaring the number 'n' to be prime;
      if a number 'r' satisfying the conditions specified in step a exists, then:
      iii. means for checking whether $(x+a)^n = x^n + a \mod (n, x^r-1)$ for all integer values of 'a' from 1 to $(2\sqrt{r} \log_2 n)$;
         if $(x+a)^n \neq x^n + a \mod (n, x^r-1)$ for any integer value of 'a' between 1 and $(2\sqrt{r} \log_2 n)$, then:
            iii.i. declaring the number 'n' to be composite; and
         if $(x+a)^n = x^n + a \mod (n, x^r-1)$ for all integer values of 'a' from 1 to $(2\sqrt{r} \log_2 n)$, then:
            iii.ii. declaring the random number 'n' to be prime.

11. A computer program product for use with a computer, the computer program product comprising a computer usable medium having a computer readable program code embodied therein for generating prime numbers for use in encryption, the computer readable program code comprising instructions for:
   a. generating a random number 'n';
   b. checking if the random number 'n' is an exact power of another positive integer;
   if the random number 'n' is an exact power of the another positive integer, then:
   c. declaring the random number 'n' to be composite;
   if the random number 'n' is not an exact power of the another positive integer, then:
   d. performing an extension ring test, the extension ring test comprising:
      i. determining the smallest number 'r' less than the random number 'n', the number 'r' satisfying the following conditions:
         1. the number 'r' is a prime number;
         2. the largest prime factor 'q' of (r-1) is greater than or equal to $(4\sqrt{r} \log_2 n)$;
         3. $n^{(r-1)/q} \neq 1 \mod (r)$; and
         4. the greatest common divisor of the number 'r' and the random number 'n' is equal to 1;
      if no number 'r' satisfying all the conditions specified in step i exists, then for all values of the number 'r' less than the random number 'n':
      ii. performing a check whether the greatest common divisor of the number 'r' and the random number 'n' is greater than 1; and
      if the greatest common divisor of 'r' and 'n' is greater than 1 for any value of the number 'r', then:
         1. declaring the number 'n' to be composite; and if the greatest common divisor of 'r' and 'n' is equal to 1 for all values of the number 'r', then:
2. declaring the number 'n' to be prime; and
if a number 'r' satisfying the conditions specified in step i exists, then:
iii. checking whether $(x+a)^n = x^n + a \mod (n, x^r - 1)$ for all integer values of 'a' from 1 to $(2\sqrt{r} \log_2 n)$;
if $(x+a)^n \neq x^n + a \mod (n, x^r - 1)$ for any integer value of 'a' between 1 and $(2\sqrt{r} \log_2 n)$, then:
1. declaring the number 'n' to be composite; and
if $(x+a)^n = x^n + a \mod (n, x^r - 1)$ for all integer values of 'a' from 1 to $(2\sqrt{r} \log_2 n)$, then:
2. declaring the random number 'n' to be prime; and
e. providing the random number 'n' to an encryption system if the random number 'n' is declared to be prime in the extension ring test.

12. A computer program product for use with a computer, the computer program product comprising a computer usable medium having a computer readable program code embodied therein for deterministically testing primality of a random number 'n' in polynomial time for use in encryption, the computer readable program code comprising instructions for:

a. checking if the random number 'n' is an exact power of another positive integer;
if the random number 'n' is an exact power of the another positive integer, then:
b. declaring the random number 'n' to be composite;
if the random number 'n' is not an exact power of the another positive integer, then:
c. performing an extension ring test, the extension ring test comprising:
  i. determining the smallest number 'r' less than the random number 'n', the number 'r' satisfying the following conditions:
    1. the number 'r' is a prime number;
    2. the largest prime factor 'q' of (r-1) is greater than or equal to $(4\sqrt{r} \log_2 n)$;
    3. $n^{(r-1)/q} \neq 1 \mod (r)$; and
    4. the greatest common divisor of the number 'r' and the random number 'n' is equal to 1;
  if no number 'r' satisfying all the conditions specified in step i exists, then for all values of the number 'r' less than the random number 'n':
  ii. performing a check whether the greatest common divisor of the number 'r' and the random number 'n' is greater than 1; and
    if the greatest common divisor of 'r' and 'n' is greater than 1 for any value of the number 'r', then:
    1. declaring the number 'n' to be composite; and
    if the greatest common divisor of 'r' and 'n' is equal to 1 for all values of the number 'r', then:
    2. declaring the number 'n' to be prime;
  and
  if a number 'r' satisfying the conditions specified in step i exists, then:
  iii. checking whether $(x+a)^n = x^n + a \mod (n, x^r - 1)$ for all integer values of 'a' from 1 to $(2\sqrt{r} \log_2 n)$;
    if $(x+a)^n \neq x + a \mod (n, x^r - 1)$ for any integer value of 'a' between 1 and $(2\sqrt{} \log_2 n)$, then:
    1. declaring the number 'n' to be composite; and
    if $(x+a)^n = x^n + a \mod (n, x^r - 1)$ for all integer values of 'a' from 1 to $(2\sqrt{r} \log_2 n)$, then:
    2. declaring the random number 'n' to be prime; and
d. providing the random number 'n' to an encryption system if the random number 'n' is declared to be prime in the extension ring test.

* * * * *